US010533861B2

(12) United States Patent
Sambongi (10) Patent No.: US 10,533,861 B2
(45) Date of Patent: Jan. 14, 2020

(54) MAP MATCHING APPARATUS

(71) Applicant: CASIO COMPUTER CO., LTD., Shibuya-ku, Tokyo (JP)

(72) Inventor: Masao Sambongi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 161 days.

(21) Appl. No.: 15/699,921

(22) Filed: Sep. 8, 2017

(65) Prior Publication Data

US 2018/0172456 A1    Jun. 21, 2018

(30) Foreign Application Priority Data

Dec. 16, 2016 (JP) .................................. 2016-243979

(51) Int. Cl.
*G01C 21/30* (2006.01)

(52) U.S. Cl.
CPC ................... *G01C 21/30* (2013.01)

(58) Field of Classification Search
CPC .................................................. G01C 21/30
USPC ....................................................... 701/445
See application file for complete search history.

(56) References Cited

U.S. PATENT DOCUMENTS

| 8,942,920 | B1 * | 1/2015 | Davidson | G01C 21/32 |
| | | | | 701/450 |
| 2006/0004512 | A1 * | 1/2006 | Herbst | G01C 21/3638 |
| | | | | 701/431 |
| 2009/0076724 | A1 * | 3/2009 | Kobayashi | G01C 21/00 |
| | | | | 701/533 |
| 2011/0112761 | A1 * | 5/2011 | Hurley | G01C 21/32 |
| | | | | 701/465 |
| 2011/0307169 | A1 * | 12/2011 | Shimizu | G01C 21/30 |
| | | | | 701/446 |
| 2012/0221244 | A1 * | 8/2012 | Georgy | G01C 21/165 |
| | | | | 701/472 |
| 2013/0151088 | A1 * | 6/2013 | Ricci | G06F 17/00 |
| | | | | 701/51 |
| 2013/0151138 | A1 * | 6/2013 | Lu | G09B 29/106 |
| | | | | 701/410 |

(Continued)

FOREIGN PATENT DOCUMENTS

| JP | 06148306 A | 5/1994 |
| JP | 2005226999 A | 8/2005 |

OTHER PUBLICATIONS

Japanese Office Action (and English language translation thereof) dated Oct. 30, 2018 issued in counterpart Japanese Application No. 2016-243979.

*Primary Examiner* — Atul Trivedi
(74) *Attorney, Agent, or Firm* — Holtz, Holtz & Volek PC (57) ABSTRACT

In a map matching apparatus, a processor executes, by the program stored in a storage unit, position measurement processing of measuring a current position, matching processing of performing, based on the current position measured in the position measurement processing, matching with a corresponding road position in the road map data stored in the map storage unit, determination processing of determining whether a candidate of a road position to be matched in the matching processing is correct or not, and matching control processing of setting, based on a determination result of the determination processing, the candidate of the road position to be matched in the matching processing.

15 Claims, 5 Drawing Sheets

(56) References Cited

U.S. PATENT DOCUMENTS

| | | | |
|---|---|---|---|
| 2014/0244164 A1* | 8/2014 | Gale | G01C 21/30 |
| | | | 701/446 |
| 2015/0338222 A1* | 11/2015 | Okada | G01C 21/30 |
| | | | 701/409 |
| 2016/0119897 A1* | 4/2016 | Kim | H04M 11/00 |
| | | | 455/569.2 |
| 2016/0178381 A1* | 6/2016 | Lynch | G01C 21/30 |
| | | | 701/23 |
| 2016/0189544 A1* | 6/2016 | Ricci | G07C 5/008 |
| | | | 701/117 |
| 2017/0336214 A1* | 11/2017 | Lynch | G01C 21/34 |
| 2018/0045517 A1* | 2/2018 | Ahuja | G01C 21/30 |

\* cited by examiner

MAP MATCHING APPARATUS

CROSS-REFERENCE TO RELATED APPLICATIONS

This application is based upon and claims the benefit of priority from Japanese Patent Application No. 2016-243979, filed Dec. 16, 2016, the entire contents of which are incorporated herein by reference.

BACKGROUND OF THE INVENTION

1. Field of the Invention

The present invention relates to a map matching apparatus.

2. Description of the Related Art

There is proposed a technique of displaying position information obtained by a GPS receiver on map information by map matching (see, for example, Jpn. Pat. Appln. KOKAI Publication No. 6-148306).

SUMMARY OF THE INVENTION

According to one aspect of the present invention, there is provided a map matching apparatus comprising: a processor; a map storage unit that stores road map data; and a storage unit that stores a program to be executed by the processor, wherein the processor executes, by the program stored in a storage unit, position measurement processing of measuring a current position, matching processing of performing, based on the current position measured in the position measurement processing, matching with a corresponding road position in the road map data stored in the map storage unit, determination processing of determining whether a candidate of a road position to be matched in the matching processing is correct or not, and matching control processing of setting, based on a determination result of the determination processing, the candidate of the road position to be matched in the matching processing.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment when the present invention is applied to a climbing navigation apparatus will be described in detail below with reference to the accompanying drawings.

Figure 1:
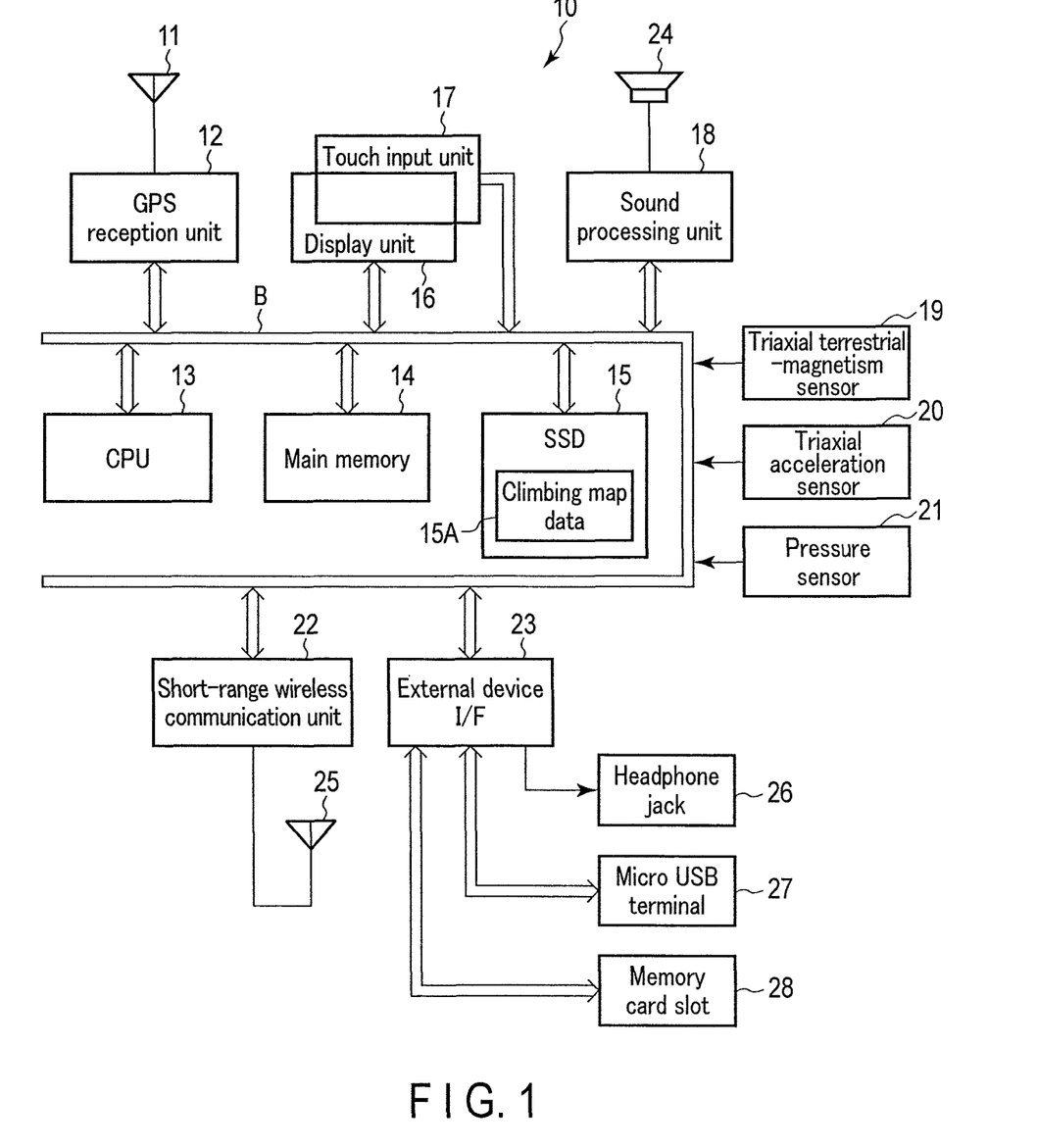
FIG. 1 is a block diagram showing the functional circuit arrangement of a climbing navigation apparatus according to an embodiment of the present invention.

FIG. 1 is a block diagram showing the functional circuit arrangement of a climbing navigation apparatus 10. Based on an incoming radio wave from a GPS (Global Positioning System) satellite (not shown) received by a GPS antenna 11, a GPS reception unit 12 of the climbing navigation apparatus 10 calculates three-dimensional coordinate data of a current position, that is, a latitude, longitude, altitude, and current time, and sends them to a CPU 13 via a bus B.

The CPU 13 controls the overall operation of the climbing navigation apparatus 10 using a main memory 14 and an SSD (Solid State Drive) 15 connected via the bus B.

The main memory 14 is formed by, for example, an SDRAM, and serves as a work memory when the CPU 13 executes a program. The SSD 15 is formed by a nonvolatile memory, and stores various operation programs necessary for a climbing route navigation operation, various permanent data including climbing map data 15A, and the like. The stored contents are loaded into the main memory 14 by the CPU 13 appropriately.

The climbing map data 15A stored in the SSD 15 is climbing topographic map data associated with three-dimensional coordinate data of each point, and the topographic map data includes climbing route data as road information.

The bus B is also connected to a display unit 16, a touch input unit 17, a sound processing unit 18, a triaxial terrestrial-magnetism sensor 19, a triaxial acceleration sensor 20, a pressure sensor 21, a short-range wireless communication unit 22, and an external device interface (I/F) 23.

The display unit 16 is formed by a color liquid crystal panel with a backlight and a driving circuit for it. The touch input unit 17 using a transparent electrode film is formed integrally with the display unit 16. The touch input unit 17 digitizes time-series coordinate signals corresponding to a touch operation by the user, and sends the obtained signals as touch operation signals to the CPU 13.

The sound processing unit 18 includes a sound source circuit such as a PCM sound source, which generates an analog sound signal in accordance with provided sound data, and causes a loudspeaker 24 to amplify the signal and emit it.

The triaxial terrestrial-magnetism sensor 19 is used to detect terrestrial magnetism in each of three axial directions orthogonal to each other, and can detect, based on the magnetic north direction, an orientation in which the climbing navigation apparatus 10 is made to face at this time.

The triaxial acceleration sensor 20 is used to detect an acceleration in each of the three-axial directions orthogonal to each other, and can detect the attitude of the climbing navigation apparatus 10 based on the direction of the gravitational acceleration.

The pressure sensor 21 is used to detect a pressure at this time. Even if the measurement accuracy of the current position degrades, the pressure sensor 21 can calculate altitude information of the current position based on the pressure at the current position by converting pressure data into altitude information based on altitude information obtained when the measurement accuracy of the current position by the GPS antenna 11 and the GPS reception unit 12 is high.

By, for example, Bluetooth® SMART or ANT+, the short-range wireless communication unit 22 is wirelessly connected, via a short-range wireless communication antenna 25, to an external apparatus for which a paring setting has been made in advance.

The external device interface 23 allows, for example, headphones or earphones, a USB device, and a memory card to be connected or attached via a headphone jack 26, a micro USB terminal 27, and a memory card slot 28, respectively.

An operation according to this embodiment will be described next.

Figure 2:
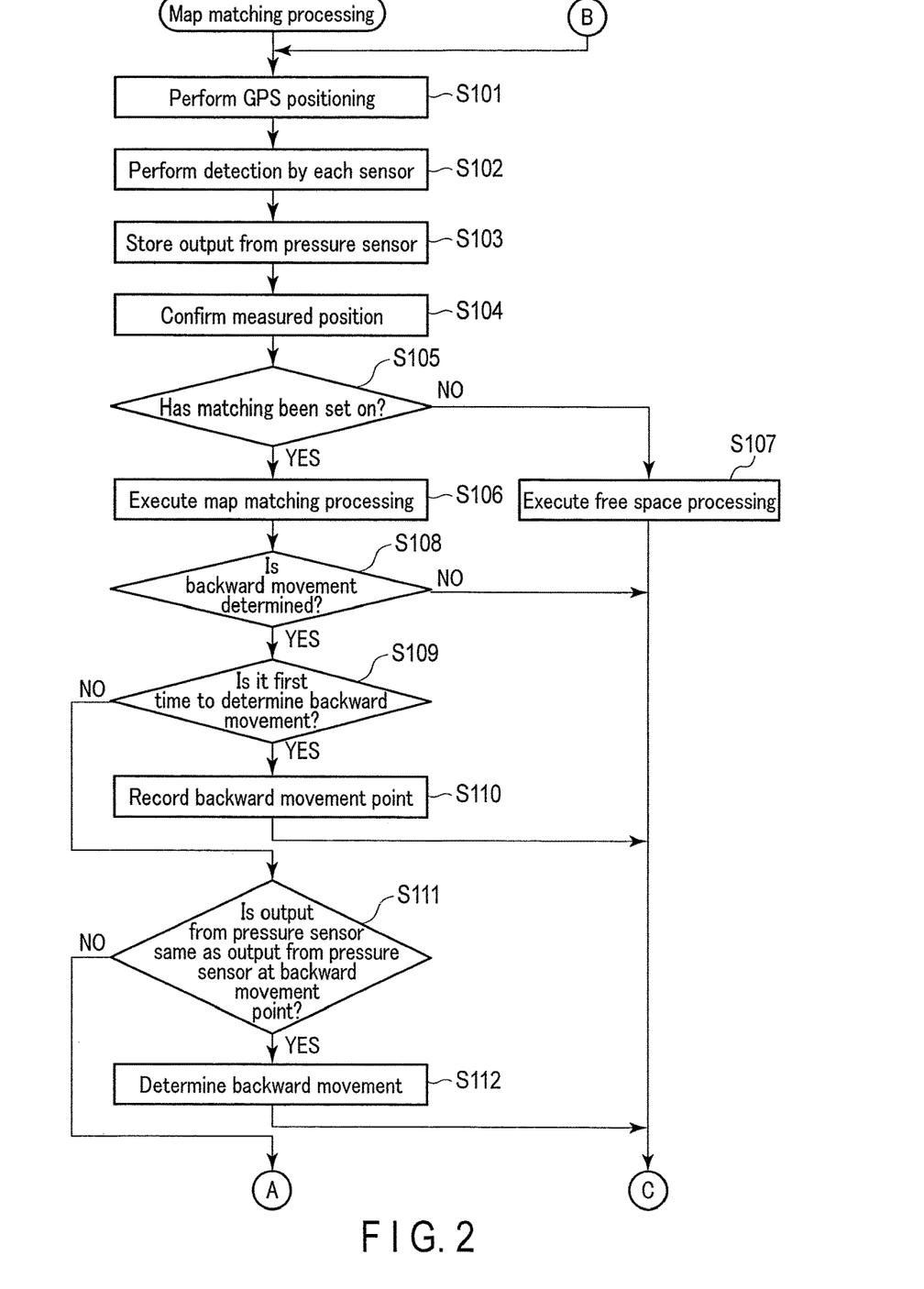
FIG. 2 is a flowchart illustrating contents of map matching processing at the time of a navigation operation according to the embodiment.
Figure 3:
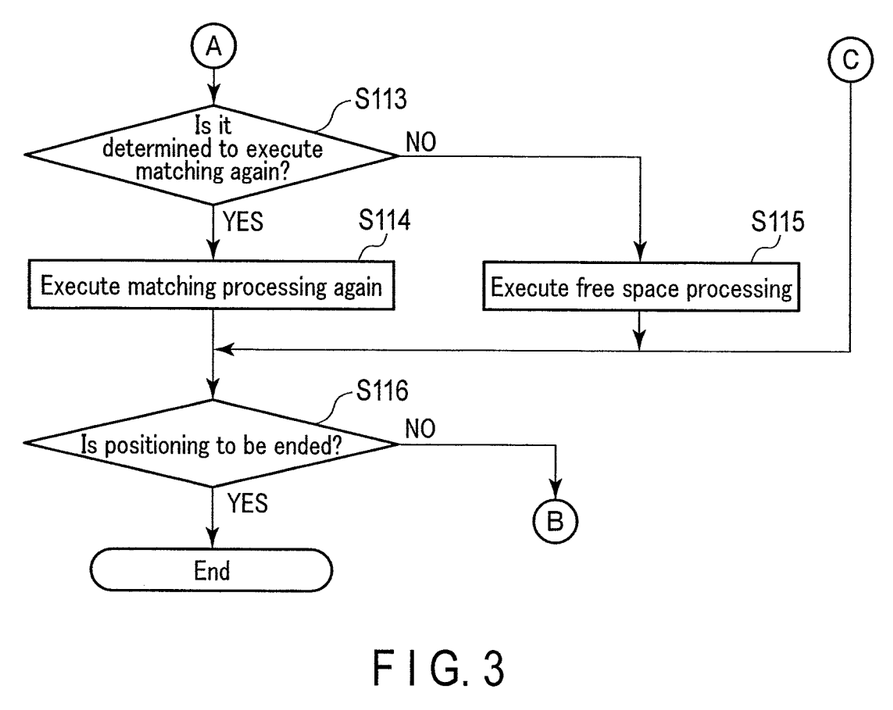
FIG. 3 is a flowchart illustrating the contents of the map matching processing at the time of the navigation operation according to the embodiment.

FIGS. 2 and 3 show processing contents when the CPU 13 displays the current position on a climbing route on the display unit 16 by a map matching technique based on the current position obtained by the GPS antenna 11 and the GPS reception unit 12, and the climbing map data 15A stored in the SSD 15.

This processing is executed when the CPU 13 reads out the operation programs, the climbing map data 15A, and the like stored in the SSD 15, and loads and stores them in the main memory 14. The processing contents are performed along with GPS positioning which is executed once in a time cycle preset by the user of the climbing navigation apparatus 10, for example, every 60 [sec].

First, the CPU 13 causes the GPS antenna 11 and the GPS reception unit 12 to measure the current position (step S101). At this time, to store current position data obtained by measurement, the CPU 13 calculates the positioning accuracy of the obtained current position data from the arrangement relationship between each GPS satellite and the climbing navigation apparatus 10 based on an obtained incoming radio wave from the GPS satellite, calculates an error value for the current position data based on the calculated positioning accuracy, and stores the error value together with the current position data.

The CPU 13 causes the triaxial terrestrial-magnetism sensor 19, the triaxial acceleration sensor 20, and the pressure sensor 21 to execute measurement, and primarily holds respective detection outputs in the main memory 14 (step S102). In addition, pressure data detected by the pressure sensor 21 is held and stored in the main memory 14 in association with the current position data obtained in immediately preceding step S101 (step S103).

The CPU 13 determines that the measurement result of the current position is confirmed by storage in the main memory 14 (step S104), and determines whether or not a map matching function has been set ON at this time to determine a method of performing display corresponding to the current position (step S105).

If it is determined that the map matching function has been set not ON but OFF (NO in step S105), the CPU 13 executes display by free space processing of the current position by displaying, based on only the current position data obtained by measurement, on the display unit 16, an image on which the symbol mark of the current position is superimposed at a position which has the same latitude/longitude on a map represented by the climbing map data 15A so that the facing orientation of the climbing navigation apparatus 10 based on the detection output from the triaxial terrestrial-magnetism sensor 19 is set in a front direction in consideration of the moving orientation so far (step S107).

After that, it is determined whether or not an instruction operation of ending the measurement of the current position by the climbing navigation apparatus 10 and the display of the climbing map based on the measurement result, for example, an instruction operation of temporarily turning off the power supply of the climbing navigation apparatus 10 has been performed (step S116).

If it is determined that the instruction operation of ending the measurement of the current position and the display of the climbing map based on the measurement result has been performed (YES in step S116), the CPU 13 ends the processing shown in FIGS. 2 and 3.

If it is determined in step S116 that no instruction operation of ending the measurement of the current position and the display of the climbing map based on the measurement result has been performed (NO in step S116), the CPU 13 returns to the processing in step S101.

If the map matching function has been set OFF, the CPU 13 repeatedly executes the processes in steps S101 to S105, S107, and S116 to continuously display the measured current position in the climbing map by the free space processing.

If it is determined in step S105 that the map matching function has been set ON (YES in step S105), the CPU 13 executes map matching processing of replacing the current position by a closest point on the climbing route within the range of the error value based on the current position data obtained by the measurement and the additionally stored error value, and displays, on the display unit 16, the replaced current position on the climbing route (step S106).

Based on the current position on the replaced climbing route and a history of preceding current positions, the CPU 13 determines whether or not the current climbing route overlaps a climbing route on which the user moves in the past and the current position is in a backward movement state in which the moving direction is opposite (step S108).

If no backward movement state is determined (NO in step S108), the CPU 13 determines that no malfunction occurs due to replacement of the current position in the map matching processing at this time, and advances to the processing in step S116.

Even if the map matching function has been set ON, while no backward movement state is determined, the CPU 13 repeatedly executes the processes in steps S101 to S106, S108, and S116 to continuously display the measured current position on the climbing route in the climbing map by the map matching processing.

If the backward movement state is determined in step S108 (YES in step S108), the CPU 13 determines whether or not it is the first time to determine the backward movement state, in accordance with whether the immediately preceding current position data of the current position data is not in the backward movement state (step S109).

If it is the first time to determine the backward movement state and the immediately preceding current position data is not in the backward movement state (YES in step S109), the CPU 13 records, in the main memory 14, the current position data as the first point at which the backward movement state is set (step S110), and the process advances to step S116.

If it is determined in step S109 that it is not the first time to determine the backward movement state and the immediately preceding current position data is in the backward movement state (NO in step S109), the CPU 13 confirms whether or not the determination of the backward movement state is correct in accordance with whether or not the detection output from the pressure sensor 21 which has been detected in correspondence with the current position data in the backward movement state is almost the same as the detection output from the pressure sensor 21 when the user passed through the same point in the last forward movement state (step S111).

If the output from the pressure sensor 21 when the user passed through the current position in the last forward movement state is almost the same as the output from the pressure sensor 21 at the current position in this backward movement state and it is thus confirmed that determination of the backward movement state is correct (YES in step S111), the CPU 13 determines again that the current state is the backward movement state to continue display on the display unit 16 (step S112), and advances to the processing in step S116.

If, in step S111, the output from the pressure sensor 21 when the user passed through the current position in the last forward movement state is largely different from the output from the pressure sensor 21 at the current position in this backward movement state, and it is thus confirmed that the determination of the backward movement state is incorrect (NO in step S111), the CPU 13 determines whether or not to execute the map matching processing again, in accordance with whether or not another climbing route for which the map matching processing can be executed, except for the climbing route for which the backward movement state has erroneously been determined, exists at a distance equal to or shorter than a predetermined distance defined by the error value from the current position (step S113).

If it is determined that there is no other climbing route for which the map matching processing can be executed, except for the climbing route for which the backward movement state has erroneously been determined (NO in step S113), the CPU 13 determines that there is no corresponding climbing route, and executes display by the free space processing of the current position by displaying, based on only the current position data obtained by measurement, on the display unit 16, an image on which the symbol mark of the current position is superimposed at a position which has the same latitude/longitude on the map represented by the climbing map data 15A (step S115). After that, the CPU 13 advances to the processing in step S116.

If it is determined in step S113 that except for the climbing route for which the backward movement state has erroneously been determined, another climbing route for which the map matching processing can be executed exists at a distance equal to or shorter than the predetermined distance defined by the error value from the current position (YES in step S113), the CPU 13 executes the map matching processing again using the other climbing route for which the map matching processing can be executed, replaces the closest point on the climbing route by the current position, and displays, on the display unit 16, the replaced current position on the climbing route (step S114). After that, the CPU 13 advances to the processing in step S116.

A process of executing the map matching processing in accordance with the climbing route in the climbing map and a reception result obtained in a state in which the reception accuracy of an incoming radio wave from a GPS satellite is poor will be exemplified below with reference to FIGS. 4, 5, and 6.

Figure 4:
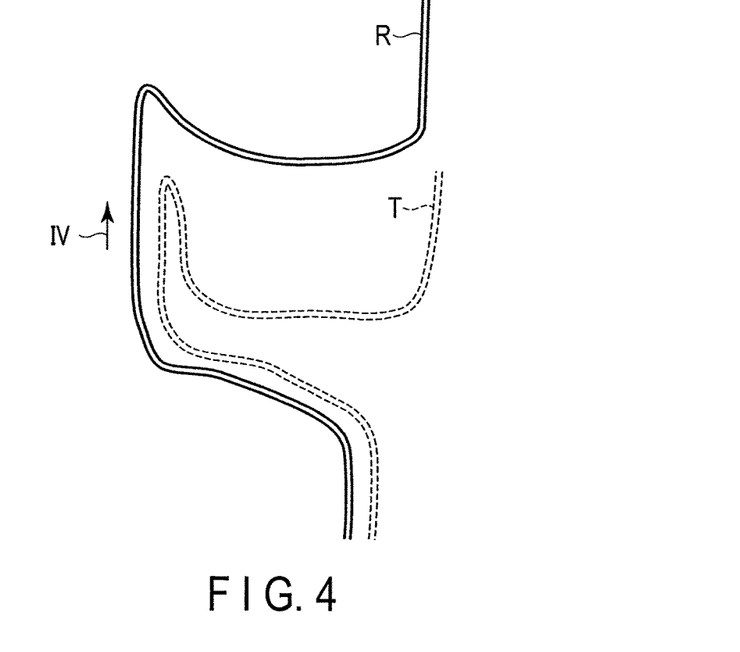
FIG. 4 is a view exemplifying a process of map matching according to the embodiment.

FIG. 4 is a view showing a climbing route R in the climbing map, and a trajectory T of the current position data obtained by the GPS antenna 11 and GPS reception unit 12 of the climbing navigation apparatus 10 when actually moving on the climbing route R along an arrow IV. The user holding the climbing navigation apparatus 10 moves on the climbing route R. Thus, if the trajectory T is matched with the climbing route R displayed on the display unit 16, no malfunction occurs.

Figure 5:
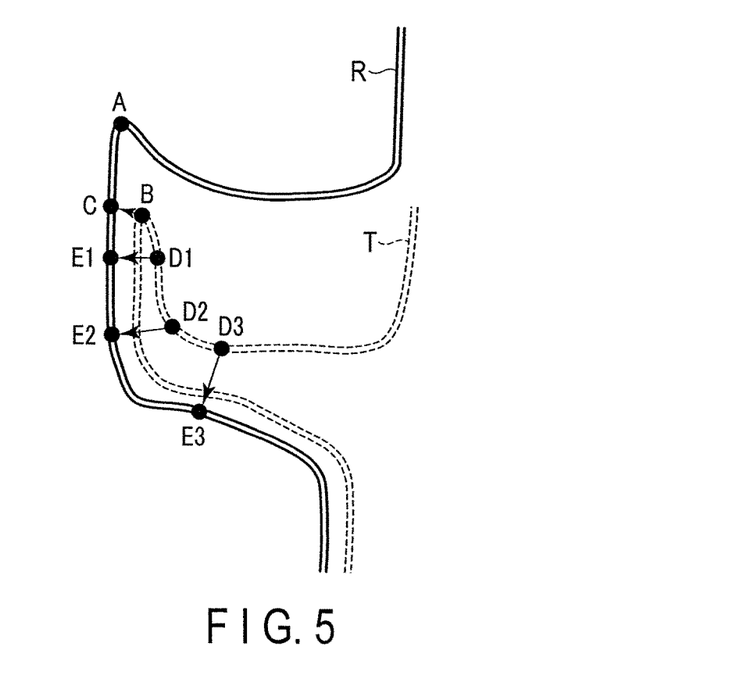
FIG. 5 is a view exemplifying a process of map matching according to the embodiment.

If, however, map matching is actually performed for the closest position, point B on the trajectory T should be originally matched with point A on the climbing route R but is matched with closest point C, as shown in FIG. 5.

Therefore, when the user holding the climbing navigation apparatus 10 moves from point A in almost the lower right direction in FIG. 5 along the climbing route R, if matching is performed for next points D1 to D3 of point B on the trajectory T based on only the closest positions in the map, points E1 to E3 on the climbing route R correspond to points D1 to D3, respectively.

If such map matching is performed intact, the user holding the climbing navigation apparatus 10 moves backward on the climbing route R displayed on the display unit 16 from point C in a direction opposite to the first moving direction IV, and is displayed to be located at one of next points E1 to E3.

Since the user of the climbing navigation apparatus 10 is displayed on the display unit 16 of the climbing navigation apparatus 10 as if he/she moved backward on the climbing route R without recollection of reversal of the moving direction on the climbing route R. This may cause unnecessary confusion.

In this embodiment, as described above, the turning point (point A corresponding to point B in FIG. 5) of backward movement is recorded at the time of initial determination of backward movement (steps S109 and S110), and it is determined whether or not altitudes estimated based on pressure values are almost equal to each other, in other words, whether or not the current position actually coincides with the point through which the user passed in the past (step S111), by determining, using the current position data obtained by further backward movement and the detection output from the pressure sensor 21, whether or not the detection output is almost the same as the detection output from the pressure sensor 21 obtained at the time of movement at the same position in the past.

Therefore, if the detection output from the pressure sensor 21 at the current position indicates a pressure almost equal to that at the point through which the user passed in the past and it is thus determined that the estimated altitudes are almost equal to each other, it is recognized that the user moves backward, and map matching is executed in accordance with the recognition result (step S112).

On the other hand, if the detection output from the pressure sensor 21 at the current position indicates a pressure value apparently different from that at the point through which the user passed in the past, and it is thus determined that the estimated altitudes are different, the map matching processing is executed as much as possible using another climbing route within a predetermined range by excluding a range of a climbing route for which the backward movement state has been determined at this time and through which the user passed in the past (step S113 to S115).

Figure 6:
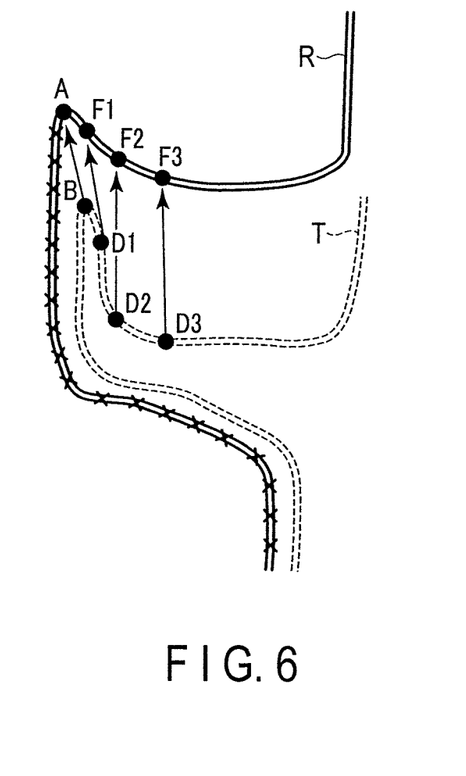
FIG. 6 is a view exemplifying a process of map matching according to the embodiment.

FIG. 6 is a view exemplifying the process of map matching executed by the CPU 13 at this time. Points E1 to E3 on the climbing route R shown in FIG. 5 are inappropriate as targets of map matching, and a portion before point A on the climbing route R, through which the user has already passed, is deleted from the matching target, as shown in FIG. 6 by adding symbols "x". This causes the CPU 13 to execute map matching as indicated by corresponding points F1 to F3 in the inevitably remaining section on the climbing route R, thereby executing correct guide display in which no unnecessary backward movement display is performed.

Note that FIG. 6 is a view for explaining a concept when a partial corresponding section of the climbing route R as the target of map matching is deleted when the CPU 13 executes the program, and the section added with the symbols "x", which is deleted from the target of map matching, is not displayed on the climbing route in the climbing map actually displayed on the display unit 16.

As described in detail above, according to this embodiment, even if the position accuracy of a road in a map is low or the measurement accuracy of the current position is low depending on an environment, it is possible to match the current position with a correct position on the road in the map.

In the above-described embodiment, it is determined based on the presence/absence of overlapping in a history of road positions whether a candidate of a road position to be matched is correct or not. Thus, the control processing can be further simplified, thereby reducing the load of the calculation processing.

Especially in the above-described embodiment, backward movement is determined in map matching when the past moving path and information of the road position overlap each other. Thus, in the GPS positioning technique, processing using altitude information whose accuracy is set very low in addition to latitude/altitude information is complemented in arrangement of the GPS satellite and design of the calculation circuit, and the presence/absence of backward movement is determined based on altitude information estimated based on pressure information.

It is, therefore, possible to correctly implement map matching while further simplifying the determination processing.

In the above-described embodiment, if no backward movement is determined, it is possible to further simplify the processing necessary for matching by excluding, from the target of map matching, a road of a corresponding section through which the user has passed.

A case in which the above-described embodiment is applied to the stand-alone climbing navigation apparatus 10 except for a portion associated with GPS positioning has been explained. The series of processes until the result of performing map matching of the current position with the climbing route in the climbing map is displayed can be implemented in a closed system environment.

Therefore, the power consumption based on the processing load of the graphic circuit is reduced, as compared with an apparatus having a system configuration that outputs display data to an arbitrary display device, thereby obtaining an apparatus that is preferable to be used at a location where it is not easy to ensure a power supply.

In the above-described embodiment, the pressure measured by the pressure sensor 21 at the current position is converted into altitude information and set as altitude information at the current position. However, another method may be used. For example, altitude information obtained by the GPS reception unit 12 may be used intact.

In the above-described embodiment, in the first map matching processing (step S105), if the matched current position on the climbing route is displayed on the display unit 16, and it is determined that the position is incorrect as a result of determining whether the position is correct or not, the matching processing (step S114) is performed again to display, on the display unit 16, the correctly matched current position on the climbing route. However, the correct position may be displayed on the display unit 16 after determining whether the position is correct or not without performing display on the display unit 16 in the first map matching processing (step S105).

The present invention is not limited to the above-described embodiment, and is applicable to a case in which a system that shares various processes except for display processing and the display processing between, for example, a smartphone storing a climbing map and a wearable device such as a wrist terminal connected to the smartphone by wireless communication.

The present invention is applicable to a car navigation apparatus that displays a general road map without limitation to the application of performing map matching of the current position with the climbing route in the climbing map.

The present invention is not limited to the above-described embodiment and various modifications can be made without departing from the scope of the present invention in practical stages. The respective embodiments may be appropriately combined as much as possible and practiced. In this case, a combined effect is obtained. The above-described embodiment incorporates various kinds of stages, and various kinds of inventions can be extracted by appropriate combinations of the plurality of disclosed constituent elements.

What is claimed is:

1. A map matching apparatus comprising:
a processor;
a map storage unit that stores road map data; and
a storage unit that stores a program to be executed by the processor,
wherein the processor, under control of the program stored in the storage unit, executes:
  position measurement processing of measuring a current position;
  matching processing of performing, based on the current position measured in the position measurement processing, matching with a corresponding road position in the road map data stored in the map storage unit;
  backward movement determination processing of determining presence of backward movement on a same road when a moving direction of the current position on the same road is opposite a moving direction of a history of road positions on the same road matched in the matching processing;
  determination processing of determining whether or not a candidate of a road position to be matched in the matching processing is correct, based on a determination result of presence/absence of the backward movement on the same road in the backward movement determination processing; and
  matching control processing of setting, based on a determination result of the determination processing, the candidate of the road position to be matched in the matching processing.

2. The apparatus of claim 1, wherein the processor, under control of the program stored in the storage unit, further executes:
altitude information acquisition processing of acquiring altitude information at the current position; and
storage processing of storing, in the storage unit, the current position measured in the position measurement processing and an altitude acquired in the altitude information acquisition processing in association with each other, and
wherein, when the presence of the backward movement on the same road is determined in the backward movement determination processing, the altitude at the current position acquired in the altitude information acquisition processing is compared with the altitude associated with the current position stored in the storage unit, and it is determined based on a comparison result whether or not the candidate of the road position to be matched is correct.

3. The apparatus of claim 2, wherein in the altitude information acquisition processing, a pressure at the current position is measured, and the altitude information at the current position is acquired based on the measured pressure.

4. The apparatus of claim 2, wherein when it is determined in the determination processing that the candidate of the road position to be matched is correct, a corresponding section of the same road stored in the storage unit is excluded, in the matching control processing, from the candidate of the road position to be matched in the matching processing.

5. The apparatus of claim 1, wherein when it is determined in the determination processing that the candidate of the road position to be matched is incorrect, another road position is set as a candidate in the matching control processing.

6. The apparatus of claim 1, wherein the processor, under control of the program stored in the storage unit, further executes display processing of displaying, on a display unit, the current position matched, in the matching processing, with the corresponding position in the road map data stored in the map storage unit.

7. The apparatus of claim 1, wherein after matching the current position with the corresponding road position in the road map data in the matching processing, it is determined in the determination processing whether or not the matched road position is correct or not.

8. A map matching method for an apparatus including a map storage unit that stores road map data, the method comprising:
    measuring a current position;
    performing, based on the current position measured in the measuring, matching with a corresponding road position in the road map data stored in the map storage unit;
    determining presence of backward movement on a same road when a moving direction of the current position on the same road is opposite a moving direction of a history of road positions on the same road matched in the matching;
    determining whether or not a candidate of a road position to be matched in the matching is correct, based on a determination result of presence/absence of the backward movement on the same road; and
    setting, based on a determination result of whether or not the candidate of the road position to be matched is correct, the candidate of the road position to be matched in the matching.

9. The method of claim 8, further comprising:
    acquiring altitude information at the current position; and
    storing, in a storage unit, the current position measured in the measuring and an altitude acquired in the acquiring in association with each other,
    wherein, when the presence of the backward movement on the same road is determined, the altitude at the current position acquired in the acquiring is compared with the altitude associated with the current position stored in the storage unit, and it is determined based on a comparison result whether or not the candidate of the road position to be matched is correct.

10. The method of claim 9, wherein in the acquiring, a pressure at the current position is measured, and the altitude information at the current position is acquired based on the measured pressure.

11. The method of claim 9, wherein when it is determined that the candidate of the road position to be matched in the matching is correct, a corresponding section of the same road stored in the storage unit is excluded, in the setting, from the candidate of the road position to be matched in the matching.

12. The method of claim 8, wherein when it is determined that the candidate of the road position to be matched in the matching is incorrect, another road position is set as a candidate in the setting.

13. The method of claim 8, further comprising:
    displaying, on a display unit, the current position matched, in the matching, with the corresponding position in the road map data stored in the map storage unit.

14. The method of claim 8, wherein after matching the current position with the corresponding road position in the road map data in the matching, it is determined whether or not the matched road position is correct.

15. A non-transitory computer-readable storage medium having a program stored thereon which controls a computer that is incorporated in an apparatus including a map storage unit that stores road map data to perform processes comprising:
    a position measurement process that measures a current position;
    a matching process that performs, based on the current position measured in the position measurement process, matching with a corresponding road position in the road map data stored in the map storage unit;
    a backward movement determination process that determines presence of backward movement on a same road when a moving direction of the current position on the same road is opposite a moving direction of a history of road positions on the same road matched in the matching process;
    a determination process that determines whether or not a candidate of a road position to be matched in the matching process is correct, based on a determination result of presence/absence of the backward movement on the same road in the backward movement determination process; and
    a matching control process that sets, based on a determination result of the determination process, the candidate of the road position to be matched in the matching process.

* * * * *

UNITED STATES PATENT AND TRADEMARK OFFICE
CERTIFICATE OF CORRECTION

PATENT NO. : 10,533,861 B2
APPLICATION NO. : 15/699921
DATED : January 14, 2020
INVENTOR(S) : Masao Sambongi Page 1 of 1

It is certified that error appears in the above-identified patent and that said Letters Patent is hereby corrected as shown below:

In the Claims

Column 9, Line 34, In Claim 7, delete "correct or not" and insert --correct--.

Signed and Sealed this
Fifth Day of May, 2020

Andrei Iancu
*Director of the United States Patent and Trademark Office*